United States Patent [19]

Naimoli

[11] 4,069,940
[45] Jan. 24, 1978

[54] CRISPY-MIX BOWL
[76] Inventor: John A. Naimoli, 939 Daly St., Philadelphia, Pa. 19148
[21] Appl. No.: 770,518
[22] Filed: Feb. 22, 1977
[51] Int. Cl.$^2$ .............................................. B65D 1/24
[52] U.S. Cl. ..................................... 220/20; D7/27; D7/38
[58] Field of Search ....................... 220/20; D7/27, 38
[56] References Cited
U.S. PATENT DOCUMENTS

| D. 176,252 | 12/1955 | Duncan | D7/27 |
|---|---|---|---|
| 1,379,519 | 5/1921 | Bjornsen | 220/20 |
| 2,207,417 | 7/1940 | Smith | 220/20 |
| 2,350,463 | 6/1944 | Kallus | 220/338 |
| 2,843,287 | 7/1958 | Finley | 220/20 |

Primary Examiner—George E. Lowrance
Attorney, Agent, or Firm—Leonard W. Suroff

[57] ABSTRACT

A bowl for use in eating cereal or the like, comprising a lower compartment including a bottom wall and a side wall extending upwardly from the bottom wall and terminating in an upper end, with the lower compartment adapted to receive therein a liquid, and cereal or the like for consumption by the user. An upper compartment extends upwardly from the lower compartment and comprises a partition extending in substantially a horizontal plane for partially enclosing the upper end of the lower compartment and forming the base of the upper compartment. The area of the partition being smaller than the area of the upper end of the lower compartment such that access to the lower compartment is obtainable. A transversely upwardly extending front panel is secured at the lower end thereof to the partition and terminates in an upper free end, with a circumferentially upwardly extending rear panel secured at the lower end thereof to the partition and terminating in an upper free end. The rear panel is joined to the front panel at each of both ends thereof, with the upper compartment adapted to receive therein a supply of cereal or the like. A cover is provided on the front panel for movement between an open position in which cereal or the like may be manually dispensed into the lower compartment of the bowl on an intermittent basis, to a closed position retaining the cereal or the like within the upper compartment.

4 Claims, 3 Drawing Figures

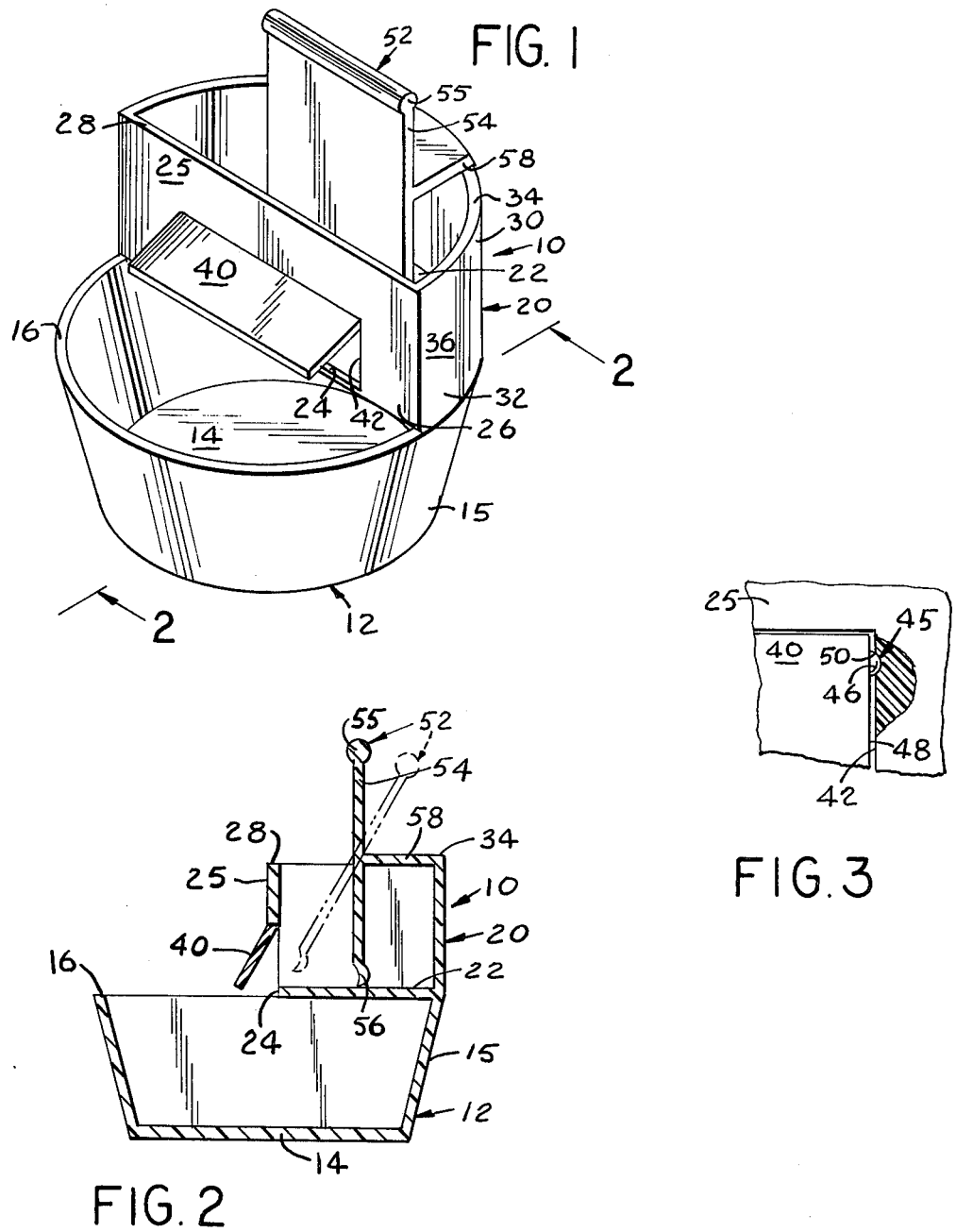

CRISPY-MIX BOWL

BACKGROUND OF THE INVENTION

1. Field of the Invention

The present invention relates to a bowl for dispensing comestibles in a new and novel manner. In particular, the invention is ideally suited for eating of cereal or the like with a liquid such as milk.

Cereal is consumed by millions of people on a daily basis. Many of these people do not wish to eat soggy cereal. The problem with eating crispy cereal is that while eating, the cereal turns soggy due to the milk that it is mixed with. Most people who eat cereal prefer to eat crisp, crunchy cereal with every spoonful, but the cereal turns soggy before the person is half way through eating it. This prevents most people from totally enjoying the cereal. My invention provides the solution to this problem.

2. Description of the Prior Art

Prior art patents contain disclosure of multiple compartmented containers, for example as illustrated in U.S. Pat. Nos. 3,381,875 and 3,394,861. In contrast to the prior art, my compartments are at different levels to permit separation of the comestibles, and ready mixing thereof when desired. The advantages and distinctions of my invention over the prior art will become more clearly evident as the disclosure proceeds.

OBJECTS OF THE INVENTION

An object of the present invention is to provide a bowl that can simultaneously store a first comestible, such as cereal or the like, and a second comestible, such as milk, and permit the introduction of the first comestible into the second comestible on an intermittent basis by the user.

Another object of the present invention is to provide a bowl that can be easily manufactured from plastic and that is easy to use in a simple manner.

Other objects and advantages of the present invention will become apparent as the disclosure proceeds.

SUMMARY OF THE INVENTION

A bowl for use in eating cereal or the like, comprising a lower compartment including a bottom wall and a side wall extending upwardly from the bottom wall and terminating in an upper end, with the lower compartment adapted to receive therein a liquid, and cereal or the like for consumption by the user. An upper compartment extends upwardly from the lower compartment and comprises a partition extending in substantially a horizontal plane for partially enclosing the upper end of the lower compartment and forming the base of the upper compartment.

The area of the partition being smaller than the area of the upper end of the lower compartment such that access to the lower compartment is obtainable. A transversely upwardly extending front panel is secured at the lower end thereof to the partition and terminates in an upper free end, with a circumferentially upwardly extending rear panel secured at the lower end thereof to the partition and terminating in an upper free end.

The rear panel is joined to the forn panel at each of both ends thereof, with the upper compartment adapted to receive therein a supply of cereal or the like. A cover is provided on the front panel for movement between an open position in which cereal or the like may be manually dispensed into the lower compartment of the bowl on an intermittent basis, to a closed position retaining the cereal or the like within the upper compartment.

The bowl may further include a sweeping element mounted within the upper compartment in spaced relationship to the cover for manually dispensing the cereal or the like through the cover opening. The sweeping element extends vertically and is adapted to be reciprocated within the upper compartment for engagment with the cereal or the like.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of the bowl in accordance with the present invention;

FIG. 2 is a sectional view taken along lines 2—2 of FIG. 1; and

FIG. 3 is an enlarged fragmentary view illustrating one form of mounting the cover utilized in the bowl.

DETAILED DESCRIPTION OF THE DRAWINGS

Referring to the drawings, there is illustrated in FIGS. 1 through 3 a bowl 10 for use in eating cereal or the like. The bowl 10 includes a lower compartment 12 having a bottom wall 14 and a side wall 15 extending upwardly from the bottom wall 14 and terminating in an open upper end 16. The lower compartment 12 is adapted to receive therein a liquid, and a cereal or the like for consumption by the user. The side wall 15 man be frustoconical in configuration with the upper end 16 of an annular shape.

An annular compartment 20 extends upwardly from the lower compartment 12 for retaining a supply of the cereal. A partition 22 extends in substantially a horizontal plane for partially enclosing the upper end 16 of the lower compartment 12 and forming the base of the upper compartment 20. The partition 22 has a leading edge 24 such that the area of the partition 22 is smaller than the area of the upper end 16 of the lower compartment 12 such that access to the lower compartment 12, as by a spoon, is obtainable.

A transversely upwardly extending front panel 25 is secured at the lower end thereof 26 to the partition 22 and terminating in an upper free end 28. A circumferentially upwardly extending rear panel 30 is secured at the lower end thereof 32 to the partition 22 and terminating in an upper free end 34. The rear panel 30 is joined to the front panel 25 at each of both ends 36 thereof. The upper compartment 20 is adapted to receive therein a supply of cereal or the like. The rear panel 30 is arcuately shaped to conform to the annular upper end 16 of the side wall 15.

A cover 40 is provided on the front panel 25 within an opening or aperture 42 for movement between an open position in which the cereal or the like may be dispensed into the lower compartment 12 of the bowl 10 on an intermittent basis, to a closed position retaining the cereal or the like within the upper compartment 20.

The cover 40 is secured by hinge means 45 to the front panel 25 for movement between the respective positions. The hinge means 45 includes a pivot element 46 extending outwardly from each end 48 of the cover 40 and adapted to be received in a complimentary recess 50 in the front panel 25 on each side of the cover 40. In this manner the cover 40 may easily swing relative to the front panel 25.

The bowl 10 may further include a sweeping element 52 mounted within the upper compartment 20 in spaced relationship to the cover 40 for manually dispensing the cereal or the like through the cover opening 42. The sweeping element 52 extends vertically and is adapted to be reciprocated within the upper compartment 20 for engagment with the cereal or the like contained therein. The sweeping element 52 has a top 54 extending above the upper free ends 28 and 34 of the upper compartment 20.

The top 54 has an enlarged rib 55 extending transversely of the sweeping element 52 for engagement by the fingers of the user to facilitate movement thereof. The bottom 56 of the sweeping element 52 may be contoured like a spoon. A hinge plate 58 supports the sweeping element 52 and connects same to the upper compartment 20. The hinge plate 58 may be flexible to permit the movement illustrated by the phantom lines in FIG. 2. The lower compartment 12, upper compartment 20, cover 40, and sweeping element 52 may all be fabricated from plastic or other suitable material.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A bowl for use in eating cereal or the like, comprising:
   a. a lower compartment including a bottom wall and a side wall extending upwardly from said bottom wall and terminating in an upper end, said lower compartment adapted to receive therein a liquid, and cereal or the like for consumption by the user,
   b. an upper compartment extending upwardly from said lower compartment, said upper compartment comprising:
      1. a partition extending in substantially a horizontal plane for partially enclosing upper end of said lower compartment and forming the base of said upper compartment, said area of said partition being smaller than the area of said upper end of said lower compartment such that access to said lower compartment is obtainable,
      2. a transversely upwardly extending front panel secured at the lower end thereof to said partition and terminating in an upper free end,
      3. a circumferentially upwardly extending rear panel secured at the lower end thereof to said partition and terminating in an upper free end, said rear panel joined to said front panel at each of both ends thereof, said upper compartment adapted to receive therein a supply of cereal or the like, and
   c. a cover on said panel for movement between an open position in which cereal or the like may be manually dispensed into said lower compartment of the bowl on an intermittent basis, to a closed position retaining the cereal or the like within said upper compartment,
   d. hinge means connecting said cover to said front panel for movement between said respective positions,
   e. said hinge means includes a pivot element extending outwardly from each end of said cover and adapted to be received in a complimentary recess in said front panel on each side of said cover,
   f. a sweeping element mounted within said upper compartment in spaced relationship to said cover for manually dispensing the cereal or the like through the cover opening,
   g. said sweeping element extending vertically and adapted to be reciprocated within said upper compartment for engagement with said cereal or the like, and
   h. said sweeping element having a top extending above said upper free end of said upper compartment.

2. A bowl as in claim 1, wherein said side wall is frustoconical in configuration and said upper end annular in shape.

3. A bowl as in claim 2, wherein said rear panel is arcuately shaped to conform to said annular upper end of said side wall.

4. A bowl as in claim 1, said top having an enlarged rib extending transversely of said sweeping element for engagement by the fingers of the user to facilitate movement thereof.

* * * * *